(12) United States Patent
Degen (10) Patent No.: US 11,011,995 B2
(45) Date of Patent: May 18, 2021

(54) POWER SUPPLY APPARATUSES AND METHODS WITH OUTPUT CONTROL FOR MULTIPLE TERMINALS INVOLVING MITIGATION OF IMBALANCE ACROSS THE MULTIPLE TERMINALS

(71) Applicant: NXP B.V., Eindhoven (NL)

(72) Inventor: Peter Theodorus Johannes Degen, Arnhem (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/623,847

(22) Filed: Jun. 15, 2017

(65) Prior Publication Data

US 2018/0367053 A1  Dec. 20, 2018

(51) Int. Cl.
- *H02M 5/293* (2006.01)
- *H02M 3/335* (2006.01)
- *H02M 1/08* (2006.01)

(52) U.S. Cl.
CPC ............. *H02M 5/293* (2013.01); *H02M 1/08* (2013.01); *H02M 3/33523* (2013.01); *H02M 3/33561* (2013.01)

(58) Field of Classification Search
CPC .... H02M 5/293; H02M 1/08; H02M 3/33561; H02M 3/33523
See application file for complete search history.

(56) References Cited

U.S. PATENT DOCUMENTS

| 4,631,654 A | 12/1986 | Houee et al. |
| 4,823,070 A | 4/1989 | Nelson |
| 7,400,063 B2 | 7/2008 | Iwashita |
| 2002/0080635 A1* | 6/2002 | Yasumura ........... H02M 3/3385 363/97 |
| 2008/0253150 A1* | 10/2008 | Wingrove ......... H02M 3/33592 363/21.14 |
| 2011/0266970 A1* | 11/2011 | Cohen ................ H05B 33/0815 315/294 |
| 2012/0091976 A1 | 4/2012 | Chen et al. |
| 2013/0329463 A1* | 12/2013 | Chen ................... H02M 1/4258 363/17 |

(Continued)

FOREIGN PATENT DOCUMENTS

| EP | 0 111 365 A2 | 6/1984 |
| EP | 0111365 A2 | 6/1984 |

(Continued)

OTHER PUBLICATIONS

C. Mullett and F. Cathell, "Improving the Regulation of Multi-Output Flyback Converters," 2009 Twenty-Fourth Annual IEEE Applied Power Electronics Conference and Exposition, Washington, DC, 2009, pp. 1923-1926.*

(Continued)

*Primary Examiner* — Kyle J Moody
*Assistant Examiner* — Jye-June Lee (57) ABSTRACT

A PWM power supply controllers are typically applied for a single output power supply. For specific applications, like LCD TV's, dual outputs are required. As a preference to only regulate one output, the performance of the system suffers when the outputs are unequally loaded. The disclosure describes a way to balance the outputs, such that when the output are unequally loaded, additional outputs are still accurately regulated.

23 Claims, 3 Drawing Sheets

(56) References Cited

U.S. PATENT DOCUMENTS

2017/0033694 A1* 2/2017 Tseng ............... H02M 3/33507

FOREIGN PATENT DOCUMENTS

| WO | 96/03003 A1 | 2/1996 |
| WO | WO09603003 A1 | 2/1996 |
| WO | 2016/045052 A1 | 3/2016 |
| WO | WO2016045052 A1 | 3/2016 |

OTHER PUBLICATIONS

AND8145/D, "A 75 W TV Power Supply Operating in Quasi-square Wave Resonant Mode using the NCP1207 Controller," Application Note, On Semiconductor, Mar. 2004.*

UCC28910, UCC28911 High-Voltage Flyback Switcher with Primary-Side Regulation and Output Current Control, Texas Instruments, Dec. 2016 (Year: 2016).*

Qing Chen, F. C. Lee and M. M. Jovanovic, "Analysis and design of multiple-output converters with stacked secondaries," Proceedings of Intelec 93: 15th International Telecommunications Energy Conference, Paris, France, 1993, pp. 365-371 vol. 1.*

Qing Chen, F. C. Lee and M. M. Jovanovic, "Analysis and design of multiple-output converters with stacked secondaries," Proceedings of Intelec 93: 15th International Telecommunications Energy Conference, Paris, France, 1993, pp. 365-371 vol. 1. (Year: 1993).*

H. Kim, J. Jung, J. Baek and H. Kim, "Analysis and Design of a Multioutput Converter Using Asymmetrical PWM Half-Bridge Flyback Converter Employing a Parallel-Series Transformer," in IEEE Transactions on Industrial Electronics, vol. 60, No. 8, pp. 3115-3125, Aug. 2013 (Year: 2013).*

M. Kumar, N. Rao, "Design and Analysis of a New Soft-Switching Multi-Output Fly-Back Converter," International Journal of Advanced Research in Electrical, Electronics and Instrumentation Engineering, vol. 4, Issue 10, pp. 8375-8382, Oct. 2015 (Year: 2015).*

H. Choi, "AN4146 Design Guidelines for Quasi-Resonant Converters Using FSCQ-series Fairchild Power Switch," Application Note, Fairchild Semiconductor Corporation, 2005 (Year: 2005).*

Gabriel Torres, "Anatomy of Switching Power Supplies," Hardware Secrets (Oct. 25, 2006).

TEA1716T Resonant Power Supply Control IC with PFC, Product Data Sheet, Rev. 3 (Nov. 30, 2012).

General SMPS Converter; three examples/sheets (2012-13).

Extended European Search Report for Patent Appln. No. 18175065.4 (dated Nov. 20, 2018).

* cited by examiner

PRIOR ART

FIG. 1

PRIOR ART

POWER SUPPLY APPARATUSES AND METHODS WITH OUTPUT CONTROL FOR MULTIPLE TERMINALS INVOLVING MITIGATION OF IMBALANCE ACROSS THE MULTIPLE TERMINALS

OVERVIEW

Aspects of various embodiments are directed to circuits and systems involving switched-mode power supplies in which power is transferred from an input node across a signal coupler, such as a transformer, to an output load having multiple power-receiving terminals.

In a typical switching power supply application, the output voltage is accurately regulated via a feedback network providing feedback from the output voltage to the primary-side controller. This feedback network, or regulation loop, typically employs an opto-coupler configured for providing electrical isolation between the primary and secondary sides. The opto-coupler is arranged on the secondary side and drives a control circuit located on the primary side of the transformer or other AC-signal-coupling circuit. A primary purpose of the control circuit is to modulate the energy driving the primary side of the transformer, for example, so that the signal driving the transformer effects the power switching function by way of pulse-width modulation.

Figure 1:
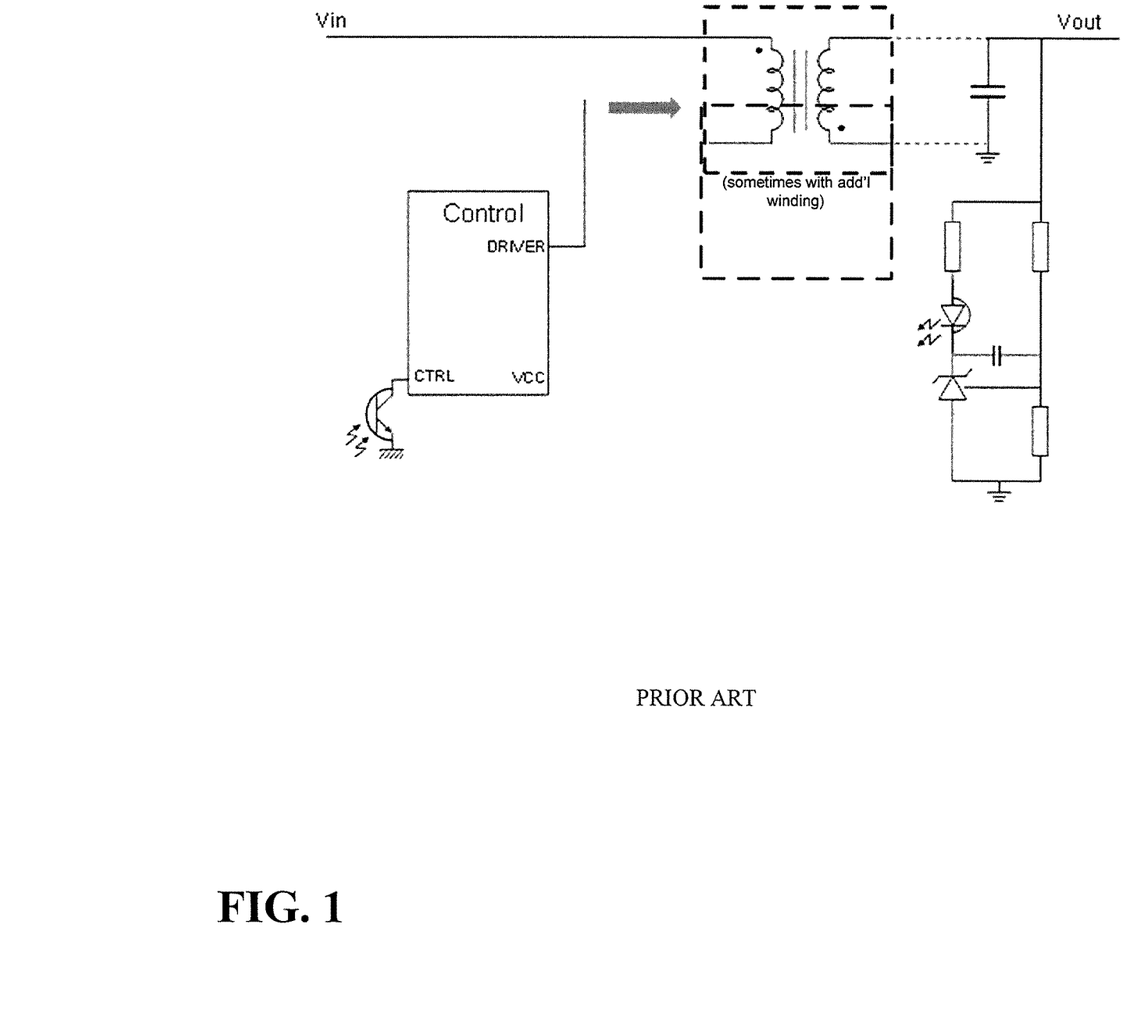
FIG. 1 is a diagram which generally depicts different types of conventional switched-mode power supplies and which shows both relevant components and signal timing.

Such a switching (or switched-mode) power supply is shown in FIG. 1. The output voltage is regulated by a feedback network including an opto coupler and as shown on the right using a voltage reference (Zener-like symbol) such as a (TL431) shunt regulator. When the output voltage increases, via the voltage reference the opto-coupler current increases which again increases the current pulled from the CTRL pin of a primary controller. The control circuit then responds by lowering the output power, which again lowers the output voltage. In this way, the output voltage is regulated.

Switching (and switched-mode) power supplies have been designed with more than one output voltage, for example, as sometimes required for providing different power supply levels to an appliance. The additional output voltages can be realized by including one or additional windings on the transformer, as shown in dashed lines in the circuit of FIG. 1. This approach has been adopted in power-supply circuits which employ flyback, resonant and forward converters. In one such example involving multiple output voltages, at startup the regulating control circuit is supplied with power directly from the mains which feed the primary side, but once the system is operating the regulating control circuit is supplied via an auxiliary Vcc (using another loop in the transformer) to increase the efficiency of the power supply.

In another example, such a switching power supply supplies operating power for household-appliance type applications such as supplying power to LCD TVs. This type of switching power supply has one voltage output (or output terminal) typically set at about 12V as needed to supply a TV controller in such an LCD TV, while an additional output voltage is set (as another nonlimiting and very specific example) at about 165V (or from around 100V to 165V) in other such examples as required to supply the LCD TV's LED backlighting circuitry. In this type of TV application, there are requirements for both output voltages with regards to output voltage level, accuracy and ripple, and the requirements for the first output voltage (e.g., 12V) are more strict than the requirements for the second output voltage (e.g., 165V); consequently, the controller circuit and the feedback network can be arranged using somewhat complex schemes with many types of components used in attempts to comply with the regulations on both of these output voltages.

Using this example involving LCD TV applications, consider unequal-load situations in which the first (12V) output has a relatively small load and the load involving the second (165V) output is relatively large. If the power supply is designed with a second output not being part of the regulation loop, the second output would be expected to be outside the requirements. The larger the disparity in the load levels, one would expect a larger lack of compliance with the supply requirements provided by the second output, with the largest noncompliance corresponding to the situation in which the first (12V) output has a negligible load or no load and the load involving the second (165V) output borders or exceeds the load-specification limits. If a second regulation loop is used to control the second output voltage, not only is additional control processing required in the control circuit, but additional components are required so that the feedback network can monitor and report on each of the output voltages. These additional components are costly, they consume circuit-area real estate and by increasing the component count, they can increase susceptibility to failure.

Some of these operational issues can be understood with reference to the conventional power supply circuit of FIG. 1. When the current drawn from the Vout terminal increases, initially the output voltage drops, the current via at opto-coupler is lowered, and the control circuit increases the output power. An additional winding can be used in the transformer to supply power to the control circuit on the primary side of the transformer, so that this special supply voltage is, at first order, following the regulated output voltage. Although this special supply voltage is defined by the transformer windings ratio, the delivered voltage can vary depending on the load.

For reasons of efficiency, the controller in such switching power supplies may be designed to have a so-called burst mode. In this mode the control circuit stops the conversion (modulation/switching effect) when the regulated output voltage exceeds the regulation level. The control circuit then just waits until this output voltage has dropped below the regulation level again before activating the modulation/switching once again. Although this type of burst mode can sometimes improve the efficiency of the power conversion, one or more additional output voltages may drop unacceptably below their minimum level when they are loaded. Another disadvantage is that when the system is operating in burst mode while the output voltage of one or more additional output voltages have dropped, due to their high loads, the regulation loop is disrupted which can result in further noncompliance with the output voltages.

Figure 2:
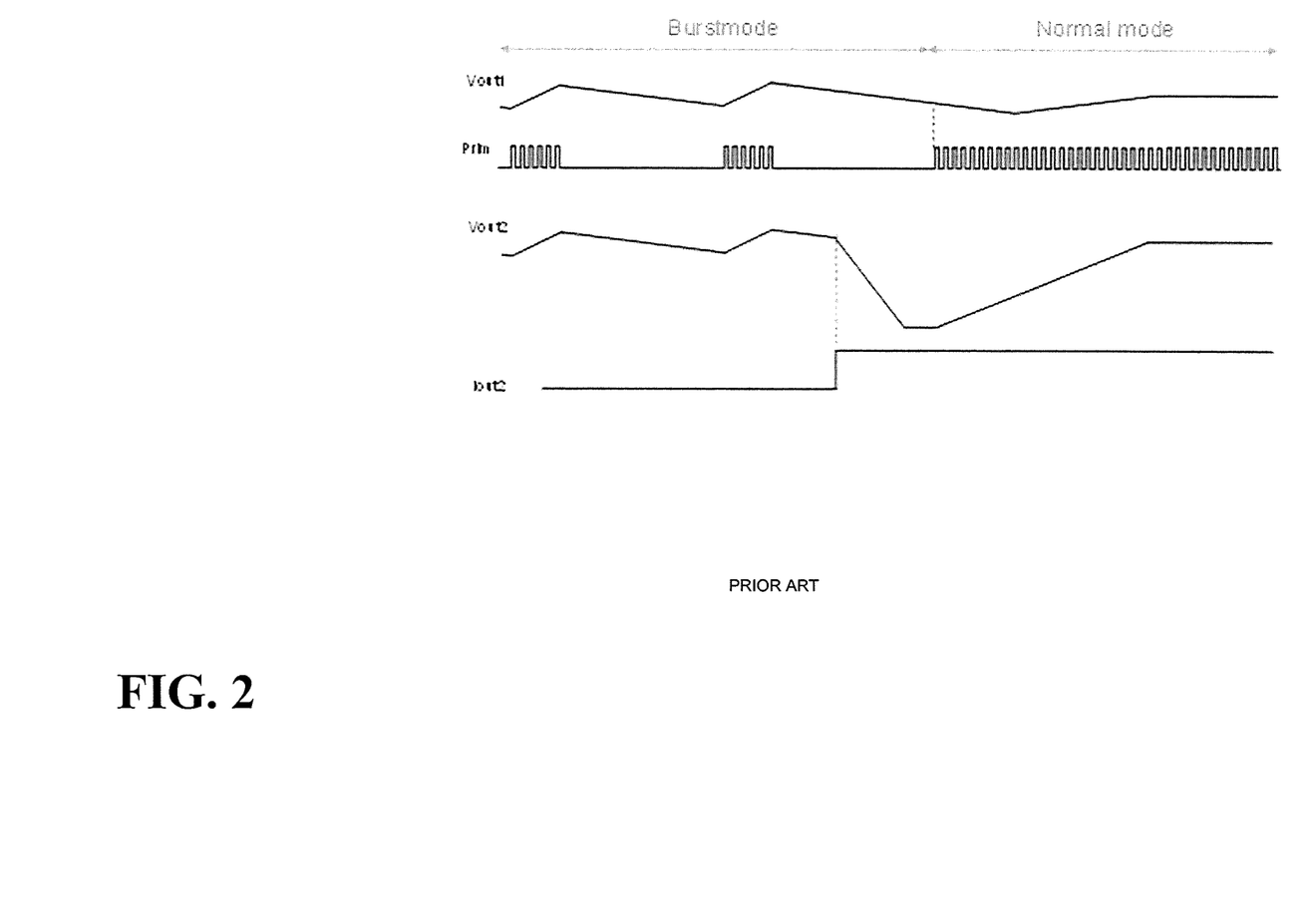
FIG. 2 is a timing diagram of signals, according to other types of conventional switched-mode power supplies.

For certain switched-mode power supplies having multiple output voltage (terminals), FIG. 2 illustrates the relevant signals including first and second output voltages (Vout1 and Vout2), the input voltage (sometimes referred to as Vin) as controlled by the control circuit for burst and normal modes, and the current at the second output voltage terminal (Iout2). As indicated by the signals Vout2 and Iout2, in comparison to Vout1, the multiple voltage outputs are significantly unbalanced as often occurs such as when they are unequally loaded.

Among various attempts to address these issues, certain switching power supplies have been designed with a resonant converter which continues switching when the feedback network indicates such adverse output-voltage levels. This approach attempts to assure compliance, for example, that the additional output(s) remain above a minimum level. This approach, however, also requires that available input power be higher than otherwise needed in negligible or no load conditions which, in turn, lowers the efficiency of the converter and undermines the ability of the control circuit to assure accurate regulation of the additional output voltage (s).

These and other issues have presented challenges to switching power supply designs and their efficiencies ensuing from such power-supply-transfer implementations and especially for applications and appliances including, but not limited to, loads requiring regulation of multiple voltages such as flat-panel televisions.

SUMMARY

Various example embodiments are directed to issues such as those addressed above and/or others which may become apparent from the following disclosure concerning switching and/or switched-mode power supplies.

In certain example embodiments, aspects of the present disclosure are directed to a discovery for use in improving the operation of power supplies having multiple output voltage terminals (or nodes) which are coupled to provide regulated output voltages. In connection with the discovery, the output voltages are accurately regulated without requiring additional components or complex designs, thereby offsetting additional costs and circuit-required real estate.

Other aspects of the present disclosure are directed to power supplies in which more accurate regulation is provided at the additional output voltage while the feedback network implements only one regulation loop for regulating one of the multiple output voltages such as the first output voltage, or has a number of multiple regulation loops which corresponds to a number which is less than the number of the total output voltages.

Certain embodiments of the present disclosure, which can also be included in the above noted embodiments, are advantageous in that they can be used in systems with a burst mode operation while maintaining the high efficiency of the system and without disturbing the feedback network with regulation loop and/or can be used in such systems without increasing the number of components and the space and cost associated therewith.

In more particular aspects, the present disclosure is directed to a switched-mode power supply circuit for transferring power at an input node to an output load via an output circuit arrangement having at least two output terminals. The switched-mode power supply circuit includes AC-coupling circuitry, front-end control circuitry and a capacitance-based filter circuit. The AC-coupling circuitry is arranged between the input node and the output load and configured to receive a modulated signal carrying the power from the input node. The front-end control circuitry is coupled to receive a feedback signal from at least one of the output terminals, and is configured and arranged to generate controlled modulation for driving the modulated signal in response to the feedback signal by providing voltage regulation to the output load. The capacitance-based filter circuit includes one or more capacitors arranged to intercouple the voltage output terminals such that in response to changes by the output load at one of the multiple output terminals, the filter circuit is configured and arranged to mitigate an imbalance relative to the respective output voltages delivered to the output load by the output terminals.

Consistent with each of the above aspects and embodiments, a more specific embodiment employs the above-characterized switched-mode power supply circuit wherein regulation by the front-end control circuitry is implemented for only one of the output terminals which provides output voltage signals to the load.

Also consistent with each of the above aspects and embodiments, other more specific embodiments involve the AC-coupling circuitry including a transformer with respectively arranged secondary windings configured and arranged to transfer energy to the output terminals, and/or involve the capacitance-based filter circuit including a capacitor which is connected between two of the output terminals to satisfy specifications for driving the output load without use of an additional regulation loop for one of the output terminals in the output circuit arrangement.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving switching power supplies (including switched-mode power supplies) which convert input energy for regulating multiple output voltages. In certain implementations, aspects of the present disclosure have been shown to be beneficial when used in the context of certain appliances (LCD/flat-panel televisions) having loads, respectively arranged for receiving the output voltages, which present varying load conditions. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

While not intended to be limiting, the present disclosure has been found to be particularly beneficial for switched-mode power supply circuits designed for transferring power (DC (direct current) or AC (alternating current)) to an output load using a circuit arrangement having two or more voltage output terminals. In one type of embodiment consistent with aspects of the present disclosure, a switched-mode power supply circuit includes AC-coupling circuitry, front-end control circuitry and a filter circuit. In certain embodiments, the filter includes (or is) a capacitor, and the AC-coupling circuitry can be implemented for most high-power situations as a transformer and in some low-power instances, using another type of AC-coupler such as an AC-bridging capacitor or capacitive circuit for carrying the modulated drive signal from the input side of the power source to the regulated side for the output voltages. In any event, the AC-coupling circuitry is arranged between the input node and the output load and configured to receive a modulated signal carrying the power from the input node.

The front-end control circuitry is coupled to receive a feedback signal from at least one of the output terminals, and is configured and arranged to generate controlled modulation for driving the modulated signal in response to the feedback signal by providing voltage regulation to the output load. The capacitance-based filter circuit includes one or more capacitors arranged to intercouple the voltage output terminals such that in response to changes by the output load at one of the multiple output terminals, the filter circuit is configured and arranged to mitigate an imbalance relative to the respective output voltages delivered to the output load by the output terminals. In certain embodiments, the front-end control circuitry can include any of a variety of opto-couplers and various types of control circuits such as the TEA1716 chip which is commercially available from NXP Semiconductors. Whether based on the TEA1716 chip or similar types of switching power control chips, the skilled artisan would appreciate that there are various ways to implement the modulation for drawing power from and for driving the AC-coupling circuit (or transformer), relative to the feedback (network) provided by the opto-coupler circuit (s) coupled to feedback signal information from the voltage output terminal(s) to the control circuit.

Figure 3:
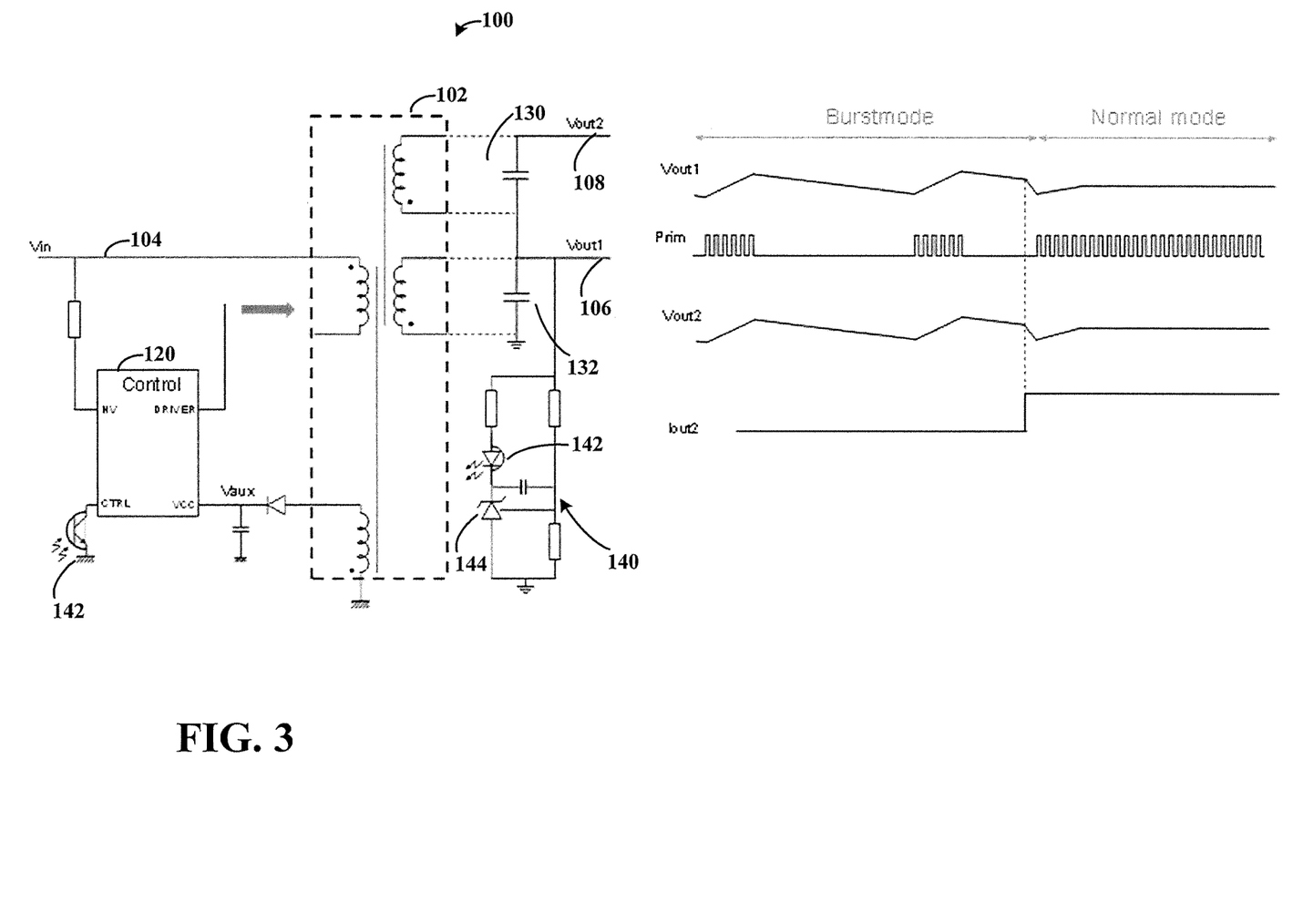
FIG. 3 is a diagram of a type of switched-mode power supply, showing both relevant components and signal timing, consistent with example embodiments of the present disclosure.

FIG. 3 illustrates an example switched-mode power supply circuit 100, consistent with such above-discussed aspects of the present disclosure. The switched-mode power supply circuit 100 is shown transferring power at an input node 104, across AC-coupling circuitry 102 to an output load which (although not explicitly shown) might be an appliance such as a flat-panel (LCD) television as discussed above and which requires at least two output voltages. These output voltages (Vout1 and Vout2) are delivered at output terminals (aka output voltage terminals) 106 and 108, are part of an output circuit arrangement which connects to the AC-coupling circuitry (or transformer) 102 as depicted using a transformer symbol.

The switched-mode power supply circuit 100 also includes front-end control circuitry 120 and a capacitance-based filter circuit 130 which operates in conjunction with a capacitor 132 (connected between ground or common for the regulated side and Vout1, terminal 106) as explained below. The filter circuit 130 is depicted in FIG. 3 as a single capacitor but can also be implemented in other manners, for example, using active or passive circuits providing such high-pass filtering attributes as a capacitor or capacitive circuit. The AC-coupling circuitry 102 is electrically coupled to the input node in order to receive a modulated signal carrying switched power. The front-end control circuitry 120 is coupled to receive a feedback signal from at least one of multiple output terminals (106 and 108 in this example) but from less than all of the multiple output terminals implemented to deliver different voltages to the appliance/load. This feedback network includes an opto-coupling circuit 140, which in turn includes both an opto-coupler 142 having parts being coupled to both circuits 106 and 120, a voltage reference circuit 144 (both as discussed in connection with FIG. 1), and also various resistors selected with appropriate values as would be conventional with the circuit shown in FIG. 1. Also consistent with FIG. 1, the AC-coupling circuitry (transformer) 102 includes a winding as part of return-power circuitry 150 for delivering supply power (Vcc) from the regulated side of AC-coupling circuitry 102 to the control circuit 120.

Using this feedback network, the control circuitry 120 is configured and arranged to generate controlled modulation for driving the modulated signal (whether using a burst mode operation or otherwise) in response to the feedback signal provided from the regulated voltage output terminal 106. To mitigate against an imbalance relative to the respective output voltages delivered to the output load by the output terminals, the capacitance-based filter circuit includes one or more capacitors arranged to intercouple the voltage output terminals 106 and 108 such that in response to changes by the output load at one of the multiple output terminals, the filter circuit effectively cancels the imbalance across the voltage output terminals 106 and 108.

Also referring to FIG. 3, shown to the right of the circuit 100 is a signal diagram which illustrates how the voltage output terminals 106 and 108 remain balanced with regulation being provided by only one regulating feedback loop for one output terminal in addition to the first, Vout1. In other words, where the power supply circuit has a total count of N voltage output terminals, this mitigation is achieved using not more than a total of N−1 regulation loops (where N is an integer greater than 1). When the number of output terminals is N, the amount of regulation loops can be from N−1 down to 1. So even in the example in which there are 10 output terminals, the aspects of the instant disclosure permit for use of only one regulation loop. In this context, when the current drawn from the Vout terminal increases, whereas initially the output voltage would be expected to drop, the capacitor 130 facilitates mitigation of any imbalance (as would be otherwise expected) between the output terminals 106 and 108. Consider if the output load of Vout2 were to increase; in this instance, the energy is supplied from the capacitor 130 and the capacitor 132. As a result, the voltage at Vout1 also decreases and the single regulation loop assures that both outputs are regulated.

With aspects of this disclosure a power supply can be readily extended with an additional output voltage without any modification or any regulation loop on the additional output voltage, and this is true even when the power supply controller has different modes of operation as occurs in a burst mode.

The above aspects disclosed herein can be used in any application benefiting from multiple secondary output voltages (Vout1, Vout2, Vout3, etc.). These aspects are independent of the choice of switched-mode power supply, and whether implemented using resonant, flyback or forward converter.

It should be understood that the terminology is used for notational convenience only and that in actual use the disclosed structures may be oriented different from the orientation shown in the figures. Thus, the terms should not be construed in a limiting manner.

The skilled artisan would also recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals (and symbols as in FIGS. 1 and 3) depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches as shown and discussed in connection with FIGS. 1-3. As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. Such modifications do not depart from the true spirit and scope of various aspects of the disclosure, including aspects set forth in the claims

What is claimed is:

1. A switched-mode power supply circuit for transferring power at an input node to an output load via an output circuit arrangement having at least two output terminals, a low-voltage terminal and a high-voltage terminal, respectively to output low and high voltages with the high voltage being greater than the low voltage, the circuit comprising:
AC-coupling circuitry, including a single primary winding and respective secondary windings, arranged between the input node and the output load and configured to receive a modulated signal carrying the power from the input node, the single primary winding being configured to feed each secondary winding;
front-end control circuitry coupled to receive a feedback signal from the low-voltage terminal and configured to generate controlled modulation by driving the modulated signal in response to the feedback signal and for providing voltage regulation to the output load; and
a capacitance-based filter circuit arranged to intercouple the output terminals wherein in response to changes by the output load at one of the at least two output terminals, the capacitance-based filter circuit is configured to mitigate an imbalance across the at least two output terminals and relative to the respective output voltages delivered to the output load by the low-voltage terminal and the high-voltage terminal, wherein power is transferred across the AC-coupling circuitry via the controlled modulation and the frond-end control circuitry is to control whether the power is transferred across the AC-coupling circuitry in response to the feedback signal.

2. The switched-mode power supply circuit as set forth in claim 1, further including a feedback circuit that provides the feedback signal and that is coupled to both the capacitance-based filter circuit and the low-voltage terminal, wherein only one of the output terminals providing output voltage signals to the load is directly regulated by the front-end control circuitry and the other of the output terminals is regulated by the capacitance-based filter circuit, the capacitance-based filter circuit being configured and arranged to respond to changes at the one of the output terminals that is regulated by the front-end control circuitry by cancelling the imbalance across the output terminals.

3. The switched-mode power supply circuit as set forth in claim 1, wherein the AC-coupling circuitry includes a transformer with respectively arranged secondary windings configured and arranged to transfer energy to the output terminals, and wherein only one of the output terminals providing output voltage signals to the load is directly regulated by the front-end control circuitry.

4. The switched-mode power supply circuit as set forth in claim 1, wherein the capacitance-based filter circuit includes a capacitor which is connected between two of the output terminals to satisfy specifications for driving the output load without use of an additional regulation loop for one of the output terminals in the output circuit arrangement.

5. The switched-mode power supply circuit as set forth in claim 1, wherein the capacitance-based filter circuit is associated with a total of N regulation loops coupling to the front-end control circuitry and a total of more than N output terminals in the output circuit arrangement, wherein N is an integer greater than one.

6. The switched-mode power supply circuit as set forth in claim 1, wherein the output circuit arrangement includes at least three output terminals respectively delivering three different output voltages to the load.

7. The switched-mode power supply circuit as set forth in claim 1, wherein the capacitance-based filter circuit includes a first capacitor and a second capacitor, the first capacitor having a capacitor terminal connected to ground or a reference voltage and another capacitor terminal connected to one of the output terminals, and the second capacitor coupled between the output terminals and having a capacitor terminal connected to the first capacitor.

8. The switched-mode power supply circuit as set forth in claim 1, wherein the AC-coupling circuitry is a transformer arranged to provide galvanic isolation between the input node and the output load.

9. The switched-mode power supply circuit as set forth in claim 1, wherein the front-end control circuitry is configured and arranged to control the modulated signal carrying the power from the input node by changing the pulse width of the modulated signal in response to the feedback signal.

10. The switched-mode power supply circuit as set forth in claim 1, wherein the feedback signal is galvanically isolated from the front-end control circuitry by an optical coupler.

11. The switched-mode power supply circuit as set forth in claim 1, further including an appliance which is configured and arranged to provide the output load configured to receive the output voltages via the output terminals.

12. The switched-mode power supply circuit as set forth in claim 1, further including a television which is configured and arranged to provide the output load configured to receive the output voltages via the output terminals.

13. The switched-mode power supply circuit of claim 1, wherein the capacitance-based filter circuit includes a capacitor directly connected to the low-voltage terminal and to the high-voltage terminal and is the only capacitor directly coupled to the high-voltage terminal and between the low-voltage terminal and the high-voltage terminal.

14. The switched-mode power supply circuit of claim 13, wherein the single primary winding is a continuous conductor, and further including a second capacitor directly coupled to the low-voltage terminal, to the capacitor of the capacitance-based filter circuit, and to ground.

15. The switched-mode power supply circuit of claim 1, wherein the single primary winding is a continuous conductor, and wherein the front-end control circuitry is configured to operate in a burst mode by, in response to a voltage at the low-voltage terminal exceeding a regulation level, terminating generating the controlled modulation.

16. The switched-mode power supply circuit of claim 1, wherein the frond-end control circuitry includes an output port at which the controlled modulation is to be generated and from which the single primary winding is to be driven for transferring power across the AC-coupling circuitry depending on whether the feedback signal indicates that the voltage regulation provided to the output load is greater than or less than the respective output voltages delivered to the output load.

17. The switched-mode power supply circuit of claim 1, wherein the frond-end control circuitry is to control whether power is transferred across the AC-coupling circuitry via the controlled modulation in response to the feedback signal.

18. The switched-mode power supply circuit of claim 1, wherein the frond-end control circuitry is to: stop the modulation in response to the feedback signal indicating the respective output voltages delivered to the output load are greater than a level at which the voltage regulation is provided to the output load; and to reactivate the modulation in response to the respective output voltages delivered to the output load being less than a level at which the voltage regulation is provided to the output load.

19. A switched-mode power supply circuit for transferring power at an input node to an output load via an output circuit arrangement having at least two output terminals, a low-voltage terminal and a high-voltage terminal, respectively to output low and high voltages with the high voltage being greater than the low voltage, the circuit comprising:
AC-coupling circuitry, including a single primary winding and respective secondary windings, arranged between the input node and the output load and configured to receive a modulated signal carrying the power from the input node, the single primary winding being configured to feed each secondary winding;
front-end control circuitry coupled to receive a feedback signal from the low-voltage terminal and configured to generate controlled modulation by driving the modulated signal in response to the feedback signal and for providing voltage regulation to the output load; and
a capacitance-based filter circuit arranged to intercouple the output terminals wherein in response to changes by the output load at one of the at least two output terminals, the capacitance-based filter circuit is configured to mitigate an imbalance across the at least two output terminals and relative to the respective output voltages delivered to the output load by the low-voltage terminal and the high-voltage terminal, wherein the front-end control circuitry is configured to control a duty cycle of the modulated signal carrying the power from the input node.

20. A switched-mode power supply circuit for transferring power at an input node to an output load via an output circuit arrangement having two output terminals, the circuit comprising:
AC-coupling circuitry arranged between the input node and the output load and configured to receive a modulated signal carrying the power from the input node;
front-end control circuitry coupled to receive a feedback signal from one of the output terminals, and configured and arranged to generate controlled modulation, at times using a burst mode signaling operation, for driving the modulated signal in response to the feedback signal by providing voltage regulation to the output load; and
a capacitance-based filter circuit arranged to intercouple the output terminals, the capacitance-based filter circuit including a first capacitor coupled between the two output terminals and a second capacitor having a capacitor terminal connected to ground or a reference voltage and another capacitor terminal connected to the second of the two output terminals and the first capacitor, the capacitance-based filter circuit being configured and arranged to respond to changes by the output load at one of the output terminals by cancelling an imbalance, due to the burst mode signaling operation, across the two output terminals, including supplying energy from the first and second capacitors to the one of the output terminals exhibiting the changes by the output load and to decrease a voltage level at the other of the two output terminals for adjusting the feedback signal to alter the driving of the modulated signal and the ensuing voltage regulation.

21. The switched-mode power supply circuit as set forth in claim 20, further including a feedback circuit that provides the feedback signal and that is coupled to both the capacitance-based filter circuit and the second of the two output terminals, wherein the front-end control circuitry is configured and arranged to receive the feedback signal from one of the output terminals while not receiving feedback from the other of the output terminals.

22. The switched-mode power supply circuit as forth in claim 20, wherein the capacitance-based filter circuit is further arranged to intercouple the two output terminals and respond to changes by the output load at the first of the two output terminals by supplying energy between the first and second capacitors to cancel the imbalance across the first and second output terminals.

23. The switched-mode power supply circuit of claim 20, wherein the frond-end control circuitry is to control whether power is transferred across the AC-coupling circuitry, in response to the feedback signal, via the controlled modulation using the burst mode signaling operation, whereby the burst mode signaling operation is stopped in response to the feedback signal indicating the respective output voltages delivered to the output load are greater than a level at which the voltage regulation is provided to the output load.

\* \* \* \* \*